(12) United States Patent
Stevenson et al.

(10) Patent No.: US 10,285,177 B2
(45) Date of Patent: May 7, 2019

(54) SYSTEM AND METHOD FOR AUTOMATIC MONITORING AND CONTROL OF SENSORS AND MACHINES IN REMOTE LOCATIONS

(71) Applicant: Rurisond, Inc., Mountain View, CA (US)

(72) Inventors: Robert S. Stevenson, Redwood City, CA (US); Thomas A. Riddle, Belmont, CA (US)

(73) Assignee: RURISOND, INC., Mountain View, CA (US)

(*) Notice: Subject to any disclaimer, the term of this patent is extended or adjusted under 35 U.S.C. 154(b) by 25 days.

(21) Appl. No.: 15/724,133

(22) Filed: Oct. 3, 2017

(65) Prior Publication Data

US 2018/0103473 A1 Apr. 12, 2018

Related U.S. Application Data

(60) Provisional application No. 62/405,612, filed on Oct. 7, 2016.

(51) Int. Cl.
*H04W 72/04* (2009.01)
*H04W 52/04* (2009.01)
(Continued)

(52) U.S. Cl.
CPC ....... *H04W 72/0453* (2013.01); *H04W 48/12* (2013.01); *H04W 52/04* (2013.01);
(Continued)

(58) Field of Classification Search
CPC . H04W 72/0453; H04W 76/10; H04W 16/14; H04W 52/242; H04W 52/246;
(Continued)

(56) References Cited

U.S. PATENT DOCUMENTS 8,041,380 B2 10/2011 Hamdi et al.
8,315,663 B2 11/2012 Hamdi et al.
(Continued)

OTHER PUBLICATIONS

Cognitive Radio, Wikipedia, retrieved from: https://en.wikipedia.org/wiki/Cognitive_radio on Aug. 22, 2017, 7 pages.
(Continued)

*Primary Examiner* — Shaima Q Aminzay
(74) *Attorney, Agent, or Firm* — Jennifer Hayes; Nixon Peabody LLP

(57) ABSTRACT

System and method for automatic communication with remote devices enabling remote control and monitoring of the devices. The primary target is for low-power, remote devices running narrow or relatively narrow bandwidths, though the method is not restricted for any payload limits. The system enables two devices on a fully automated basis to identify each other, sound the radio paths between them to discover spectrum characteristics, select and exchange a vector of currently unused and optimum frequency bands for communication. Once defined, the devices use the frequency bands for automatic communication. The method enables devices to configure themselves for exchange of data and then the transfer of data. The base station and/or end points have the ability to initiate a connection and data transfer and use software defined radios to implement this capability.

42 Claims, 9 Drawing Sheets

(51) Int. Cl.
*H04W 76/10* (2018.01)
*H04W 48/12* (2009.01)
*H04W 8/24* (2009.01)
*H04W 16/14* (2009.01)

(52) U.S. Cl.
CPC .............. *H04W 76/10* (2018.02); *H04W 8/24* (2013.01); *H04W 16/14* (2013.01); *Y02D 70/162* (2018.01); *Y02D 70/20* (2018.01); *Y02D 70/22* (2018.01)

(58) Field of Classification Search
CPC ... H04W 72/085; H04W 48/12; H04W 52/04; Y02D 70/142
USPC ......................................................... 455/517
See application file for complete search history.

(56) References Cited

U.S. PATENT DOCUMENTS

| | | |
|---|---|---|
| 8,521,094 B2 | 8/2013 | Hamdi et al. |
| 8,867,521 B2 | 10/2014 | Hakola et al. |
| 9,232,514 B2 | 1/2016 | Koskela et al. |
| 9,300,394 B2 | 3/2016 | Pandharipande et al. |
| 9,357,399 B2 | 5/2016 | Kwon et al. |
| 2005/0227625 A1 | 10/2005 | Diener |
| 2009/0046625 A1* | 2/2009 | Diener .................. H04L 1/0001 370/319 |
| 2010/0136989 A1 | 6/2010 | Westerberg et al. |
| 2012/0125772 A1 | 5/2012 | Stetter et al. |
| 2018/0110030 A1 | 4/2018 | Stevenson et al. |

OTHER PUBLICATIONS

Band Sharing in Public Sector Spectrum—Negotiating Rights for Commercial Use, Analysis Mason, White Paper, 4 pages.
Spectrum Database Help, Google, 2016, retrieved from: https://support.google.com/spectrumdatabase/?hl=en on May 6, 2016, 7 pages.
Matheson et al., The Technical Basis for Spectrum Rights: Policies to Enhance Market Efficiency, Brookings, 2011, pp. 1-55.
Peha, J.M., Approaches to Spectrum Sharing, Regulatory and Policy Issues, IEEE Communications Magazine, 2005, pp. 10 and 12.
Peha, J.M., How America's Fragmented Approach to Public Safety Wastes Money and Spectrum, 33rd Telecommunications Policy Research Conference, 2005, pp. 1-18.
Tac Radios, Multi-Service Tactics, Techniques and Procedures for Tactical Radios, Army, Marine Corps, Navy, Air Force, 2013, 144 pages.

* cited by examiner

SYSTEM AND METHOD FOR AUTOMATIC MONITORING AND CONTROL OF SENSORS AND MACHINES IN REMOTE LOCATIONS

CROSS-REFERENCE TO RELATED APPLICATIONS

This application claims priority to U.S. provisional application Ser. No. 62/405,612, filed Oct. 7, 2016, entitled "SYSTEM AND METHOD FOR AUTOMATIC MONITORING AND CONTROL OF SENSORS AND MACHINES IN REMOTE LOCATIONS," the entirety of which is hereby incorporated by reference.

BACKGROUND

1. Field

The present disclosure relates to radio communication systems. Specifically, the present disclosure relates to automatic communication with remote devices using currently unused and optimum frequency bands for communication.

2. Related Art

Communication with remote devices such as sensors requires narrow or relatively narrow bandwidths using very low power. In urban areas, cellular service can be a choice but it has its problems. Cellular services can be pricey for small data applications and are typically oriented towards humans rather than machines and also the technology requires regular contact between the base station and the device. Outside of the cellular service areas, typically in rural and remote areas, cellular service is at best patchy or non-existent. The only non-custom viable alternative is using satellite communication. Low data-rate satellite communication service is expensive, slow and has its own coverage problems.

In the United States, federal agencies such as the Federal Communications Commission (FCC) and NIST administer the spectrum usage. The HF band (3-30 MHz) and VHF (30-300 MHz) frequency spectrums are designated as shared spectrum by the FCC. Different segments within the spectrum are in use today by emergency and utility companies in an intermittent fashion. The utilization of the shared spectrum by primary (licensed or high-priority) users as of date is very low (typically below 20%). This enables secondary (unlicensed or lower-priority) users to opportunistically utilize the unused primary (licensed) bands. In addition to the primary users, the communication of secondary users is affected by environmental (terrain) and temporal (time of day, season etc.) characteristics. For remote devices, these additional factors can be vital for effective communication, so it is important to identify optimum and unused frequency bands.

Current technologies do not adequately address the needs of communication with remote devices. Communication with remote devices can be cheaper and more reliable if a system and method can be found that enables automatic communication by identifying unused and optimum frequency bands and routes for communication and using the frequency bands for communication.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In accordance with one aspect of the invention, a method is disclosed that includes performing a routine by a base station radio to find a remote end radio; identifying the remote end radio; transmitting a beacon from the base station radio to the remote end radio over a configuration band frequency vector wireless communication link; receiving a response from the remote end radio over the configuration band frequency vector wireless communication link, the response being a request for connection from the remote end radio; configuring the connection between the base station and the remote end radio, wherein configuring the connection comprises identifying a bearer process frequency vector wireless communication link; and exchanging information between the base station and the remote end radio over the bearer process frequency vector wireless communication link.

The method may further include uniquely identifying the remote end radio.

Uniquely identifying the remote end radio may include a probing process and beacon protocol.

The probing process and beacon protocol may include creating a list of frequencies to transmit and/or scan.

The method may further include creating the list, wherein the list is created by scanning a particular band of energy and marking the frequencies using the historical records/databases, heuristics and the calculated local propagation window or a list of all frequencies.

The method may further include detecting spectrum characteristics.

The method may further include detecting unused frequency bands available for secondary use. The unused frequency bands may be detected and characterized based on temporal characteristics.

The method may further include creating a list of optimum frequency bands for information exchange based on the spectrum characteristics and unused frequency bands.

The method may further include automatically detecting the presence of a primary user and automatically moving to a different frequency band.

The method may further include exchanging a list of optimum frequency bands with adjacent remote end radios and/or base stations.

The method may further include monitoring and configuring the link between the base station radio and the remote end radio during the data exchange.

The method may further include automatically adjusting the bearer process frequency vector used for data transfer based on assessment of key parameters.

Data transfer may be initiated by the base station radio or the remote end radio.

The data exchange may be protocol agnostic.

Security/encryption between the base station radio and the remote end radio may be negotiated.

The method may further include end-to-end encrypting during the data exchange.

The wireless communication link may be in a network comprising at least one of star network, mesh network or hybrid network topology.

The method may further include dynamically selecting a best route for data exchange. The method may further include evaluating multiple routes between the base station radio and the remote end radio. The multiple routes may include at least one of different frequencies, involve different antennas, involve indirect hops through reachable remote end radios.

In accordance with another aspect of the invention, a system is disclosed that includes a base station radio; a plurality of remote end radios, each of the plurality of end radios coupled to at least one data collection device, wherein the base station radio is configured to: find a remote end radio from the plurality of remote end radios; identify the remote end radio; transmit a beacon from the base station radio to the remote end radio over a configuration band frequency vector wireless communication link; receive a response from the remote end radio over the configuration band frequency vector wireless communication link, the response being a request for connection from the remote end radio; configure the connection between the base station and the remote end radio, wherein configuring the connection comprises identifying a bearer process frequency vector wireless communication link; and exchange information between the base station and the remote end radio over the bearer process frequency vector wireless communication link.

The base station radio may be further configured to uniquely identify the remote end radio.

Uniquely identifying the remote end radio may include a probing process and beacon protocol. The probing process and beacon protocol may include creating a list of frequencies to transmit and/or scan. The base station radio may be further configured to create the list, wherein the list is created by scanning a particular band of energy and marking the frequencies using the historical records/databases, heuristics and the calculated local propagation window or a list of all frequencies.

The base station radio may be further configured to detect spectrum characteristics.

The base station radio may be further configured to detect unused frequency bands available for secondary use.

Unused frequency bands may be detected and characterized based on temporal characteristics.

The base station radio may be further configured to create a list of optimum frequency bands for information exchange based on the spectrum characteristics and unused frequency bands.

The base station radio may be further configured to automatically detect the presence of a primary user and automatically moving to a different frequency band.

The base station radio may be further configured to exchange a list of optimum frequency bands with adjacent remote end radios and/or base stations.

The base station radio may be further configured to monitor and configure the link between the base station radio and the remote end radio during the data exchange.

The base station radio may be further configured to automatically adjust the bearer process frequency vector used for data transfer based on assessment of key parameters.

Data transfer may be initiated by the base station radio or the remote end radio.

The data exchange may be protocol agnostic.

Security/encryption between the base station radio and the remote end radio may be negotiated.

The base station may be further configured to end-to-end encrypt during the data exchange.

The wireless communication link may be in a network comprising at least one of star network, mesh network or hybrid network topology.

The base station may be further configured to dynamically select a best route for data exchange. The base station may be further configured to evaluate multiple routes between the base station radio and the remote end radio. The multiple routes may include at least one of different frequencies, involve different antennas, involve indirect hops through reachable remote end radios.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/ or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
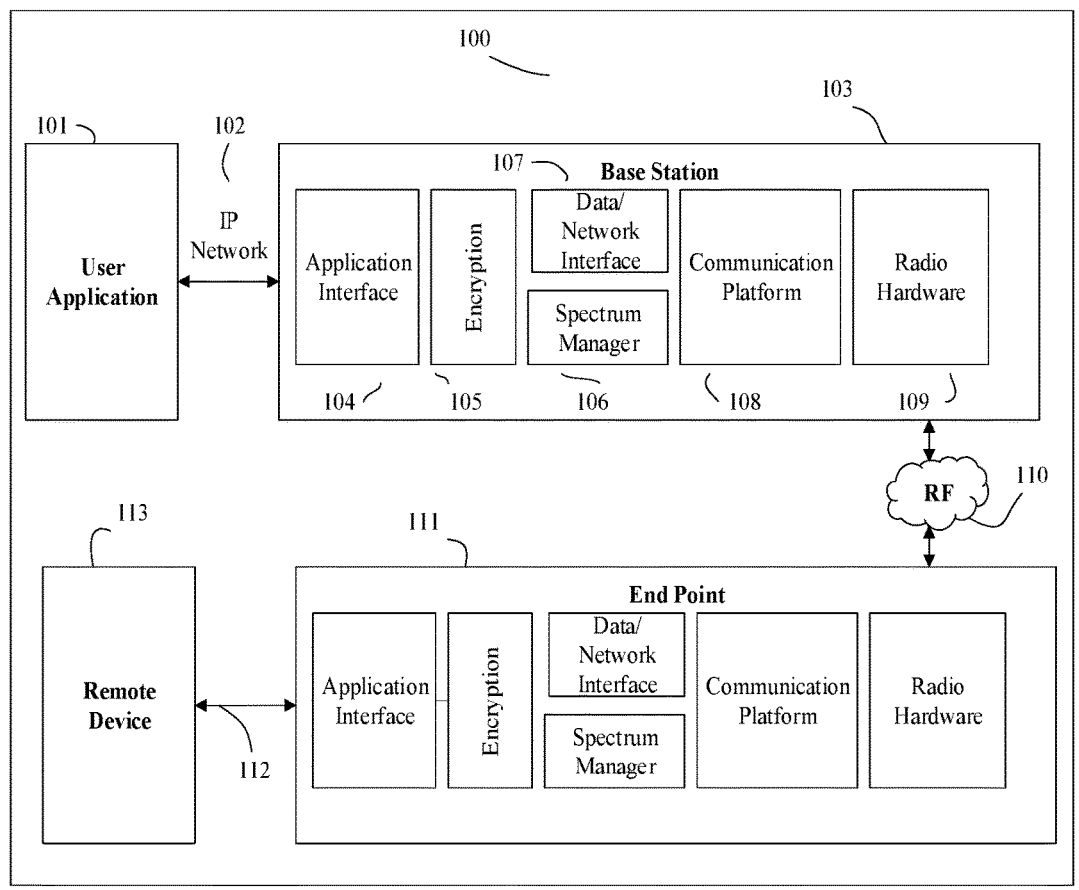
FIG. 1 shows an exemplary implementation of a system in accordance with one embodiment of the invention.

System and method for automatic communication with remote devices enabling remote control and monitoring of the devices. The primary target is for low-power, remote devices running narrow or relatively narrow bandwidths, though the method is not restricted for any payload limits. The system enables two devices on a fully automated basis to identify each other, sound the radio paths between them to discover spectrum characteristics, select and exchange a vector of currently unused and optimum frequency bands for communication. Once defined, the devices use the frequency bands for automatic communication. The method enables devices to configure themselves for exchange of data and then the transfer of data. The base station and/or end points can initiate a connection and data transfer and use software defined radios to implement this capability FIG. 1 shows an exemplary implementation of the system 100. As shown in FIG. 1, the system 100 includes a base station radio (BR) 103 communicating with an endpoint radio (ER) 111 via radio frequency (RF) spectrum 110. In FIG. 1, the functionality of the ER is shown as identical to the BR. It will be appreciated that the functionality of the BR 103 and the ER 111 can be the same or different and can include or exclude functions as per implementation requirements. The functionality implemented by ER 111 can be different that of the BR 103, where an ER 111 can be smaller, less expensive and have lesser functionality. An ER 111 can simulate a BR 103 and potentially forward traffic to an internet connection.

The user application 101 is for external control and can be used for communicating with BR 103. The user application 101 can include applications such as email, chat/IM, SMS, and/or remote management software and communicates with BR 103 using protocols such as IP (Internet Protocol) 102. The user application 101 is typically implemented as a GUI running on an external server (not shown).

As shown in FIG. 1, the remote device 113 is connected to the ER 111. The remote device 113 includes devices such as data loggers, sensors, etc. The remote device may operate in harsh environments and may need to operate in typical operating conditions (temperature etc.). To support a harsher operating environment and conditions, ER/BR may be ruggedized. The ruggedization ensures that the radios are designed and tested to withstand and operate reliably and efficiently under the worst case environmental conditions at the remote locations where they are deployed. For example, the BR and ER may be designed to provide better resistance to wear, stress, and abuse and are designed to withstand harsh climatic conditions), be small in size (slightly larger than standard routers), of low cost for use with standard sensor technology and also have low power usage. The ruggedized radios are tested to confirm they meet rugged design criteria.

The remote device 113 communicates with ER 111 using a standard interface 112. The ER 111 and remote device 113 may include one or more interfaces, including wired interfaces or wireless interfaces (e.g., Serial, Ethernet, USB, I2C, SPI, SATA, ZigBee, custom interfaces, etc.). The standard interface 112 may be supported by a processor. The standard interface 112, if required, can be implemented by discrete components, daughter cards, FPGAs etc. to support an even wider range of interfaces.

The BR 103 and/or ER 111 may include one or more of an application interface 104, an encryption device, 105, a spectrum manager 106, a data/network interface 107, a communications platform 108 and radio hardware 109. The functionality of the BR 103 and ER 111, as well as one or more the application interface 104, encryption device 105, spectrum manager 106, data/network interface 107, communication platform 108, and/or radio hardware 109) can be implemented using one or more processors, software instructions stored in memory (or computer readable medium for executing software stored in memory), discrete components (DSP (Digital Signal Processor), memory), SoCs (System-on-Chip), Field Programmable Gate Arrays (FPGAs), ASICs (Application Specific Integrated Circuit), or other ASPP (application specific programmable processors), or combinations thereof. The radio hardware 109 can be implemented as a combination of one or more processors, software and typical radio hardware components; alternatively, the radio hardware 109 may be implemented entirely in hardware. Typically, the radio hardware 109 (also sometimes referred to as PHY or physical layer) includes an antenna, transceiver, ADC, DAC, and the like. The signal processing within BR 103 and ER 111 may be implemented as a SDR (Software Defined Radio) cognitive radio.

The application interface 104 handles functionality such as remote management of interface, applications, ER application, ER updating (firmware, application), ER location reporting, ER communication scheduling and statistics. The encryption device 105 handles the encryption of data being transferred. Any known or later developed encryption methodology can be used to encrypt the data being transferred as known to persons of skill in the art. The spectrum manager 106 is used to scan the operating spectrum for primary signals on a continuous basis. The spectrum manager 106 maintains a list of open operating frequencies and selects the final operating frequency bands. The raw spectrum data obtained is also used for detailed signal identification, to update the spectrum conditions and historical trends.

The data/network interface 107 manages and maintains the data connections and manages the various nodes in the network. The data /network interface 107 is adapted to perform functions such as Frequency Band Manager, Router, IP Mapping, Node registration, etc. functions. The data/network interface 107 determines the frequencies within the selected operating band for data transfer.

The communication platform 108 along with the radio hardware 109 handle the physical point-to-point connection over the open RF spectrum 110. The communication platform 108 and radio hardware 109 perform functions such as modulation/waveforms (including low power beacon/ sounding waveforms specifically to probe potential radio propagation paths), source/error coding, transmit power control and antenna control. The source/error coding is based on scalable coding approaches where selection of the coding scheme is based on current signal conditions.

The spectrum manager 106, data/network interface 107, communication platform 108 and radio hardware 109 may be implemented as software defined cognitive radios as these functions require a high degree of programmability and configurability. Typically, software defined cognitive radios are implemented using configurable software or firmware and radio hardware (PHY). However, due to implementation requirements (power, performance, price etc.) it may not possible to implement BR/ER using software (processor, Application specific programmable processor etc.) and some of the functional blocks may require discrete components, ASIC, FPGAs, DSP etc.

Figure 2:
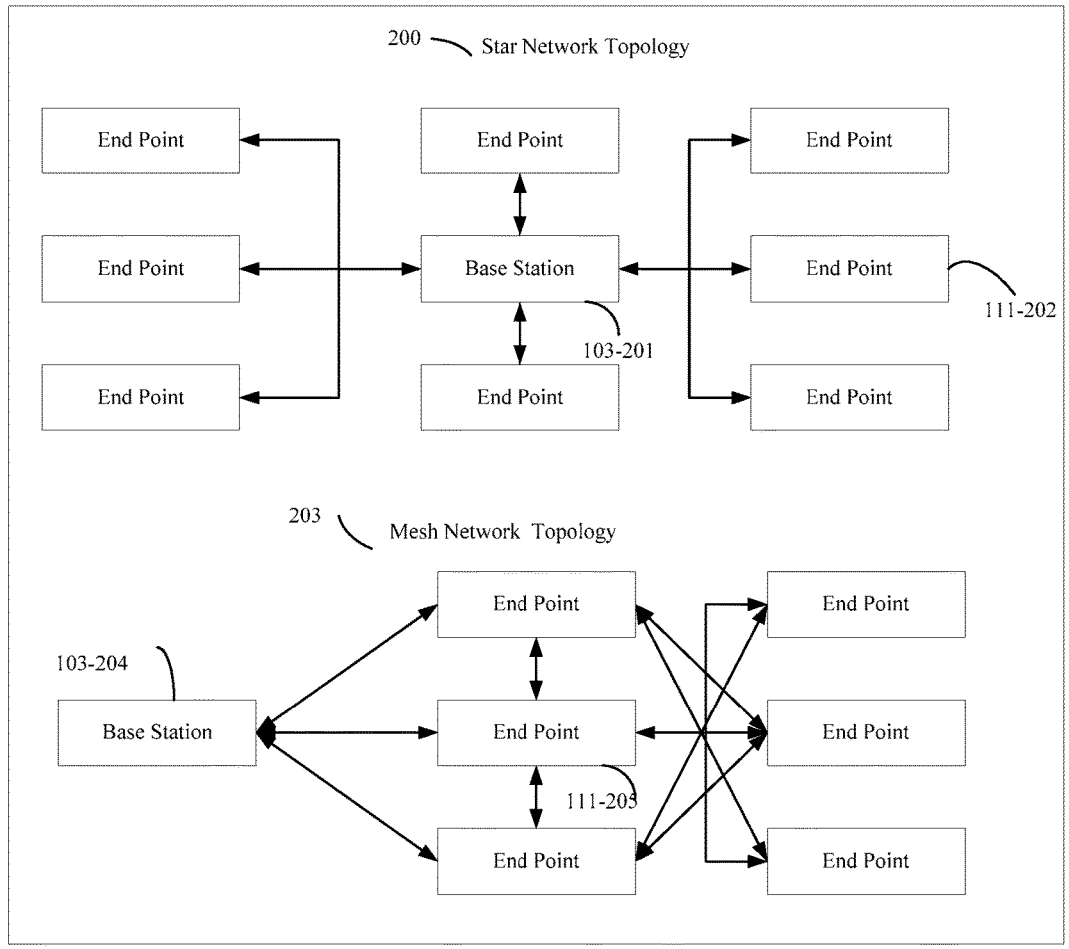
FIG. 2 shows examples of star and mesh network topologies respectively.
Figure 3:
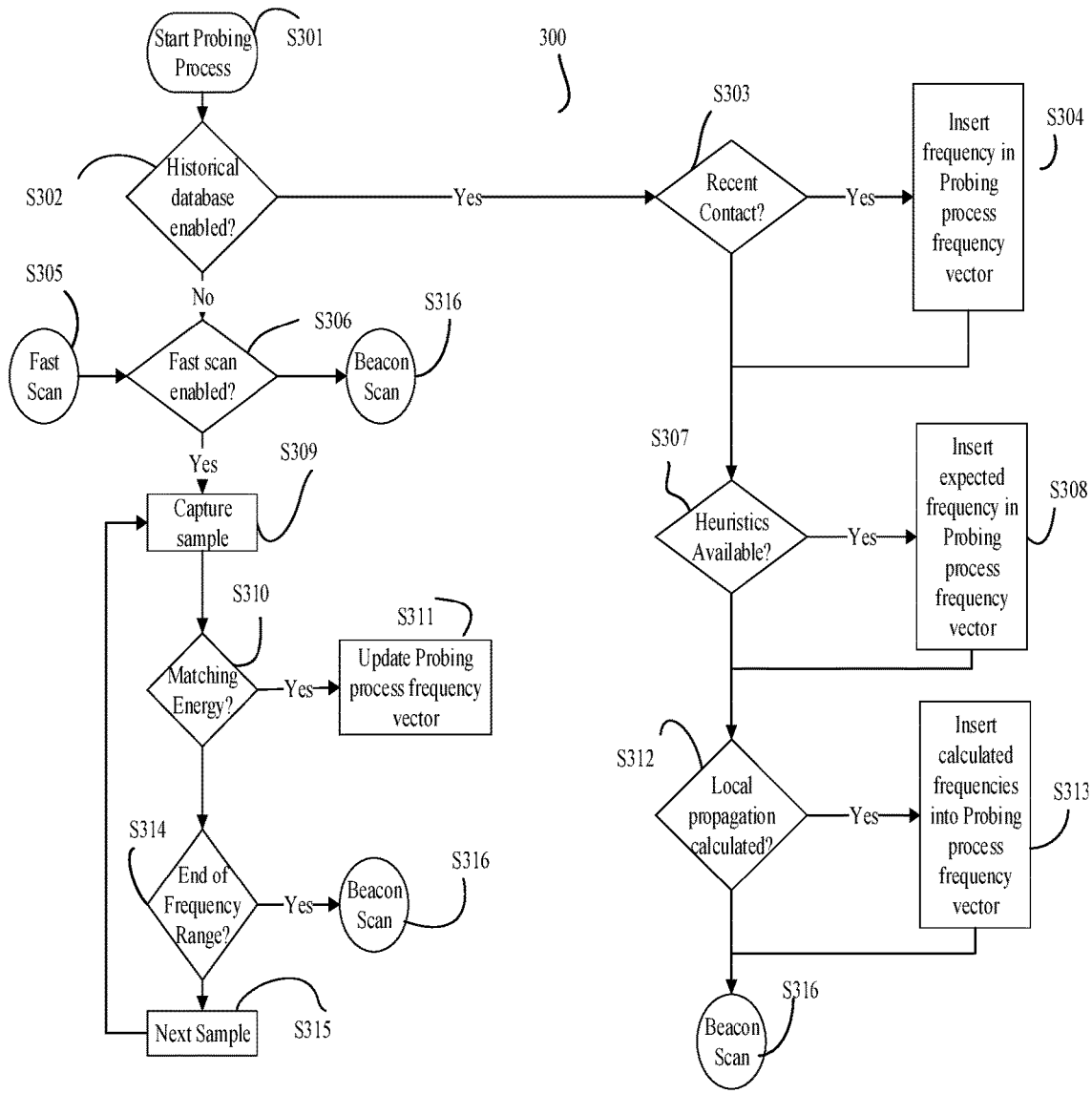
FIGS. 3, 4, 5, and 6 are a continuous exemplary flow chart of an exemplary method in accordance with one embodiment of the invention, enabling a pair of devices to identify and setup to perform initial communication.

FIG. 2 shows examples of star network and mesh network topologies and how the BR 103 and ER111 are organized in the network. Base station radio 103-201 is connected to end point radio 111-202 in a star network topology 200. Base station radio 103-204 is connected to end point radios 111-205 in a mesh network topology 203. Embodiments of the invention can be used in a star, mesh or a hybrid network topology including point-to-point network.

For a successful data transfer to be effected, embodiments of the invention use a hierarchy of exemplary steps. It will be appreciated that the steps are merely exemplary and that additional or fewer steps may be included and that the order of some of the steps may vary from that described below. The first step is to successfully find and identify another ER111 or BR 103 acting as an end point radio (ER) 111. This process of identification of an appropriate ER 111 is referred to as the probing process. Once the devices have been identified, the probing process is followed by a configuration process. The configuration process is used to configure and manage the link between the BR 103 and the identified ER 111. The final step is referred to as the bearer process where the data/information is exchanged between the BR 103 and the ER 111 over the wireless link established over the open RF spectrum 110.

In the probing process BR 103 employs a very narrow frequency band(s) referred to as beacon to advertise its existence and perform initial communication. Narrowband, narrowband signal, very narrow frequency band(s) or narrow frequency band refers to communication using a narrower set or band of frequencies just sufficient to handle the data transfer rather than the total available band, typically any value or range of values between about 5 Hz and 500 Hz. The terms frequency band or frequency channel are used interchangeably in this invention. Frequency band is list of frequencies that don't have to line up on particular frequency boundaries and so on and the term is used a compact way of to refer to the frequency list(s). A BR 103 or ER 111 may initiate a connection by scanning for a beacon or transmit a beacon of its own. A BR 103 or ER 111 can transmit a beacon and initiate the connection in embodiments of the invention. Typically, a BR 103 or an ER 111 initiates a connection by scanning for the beacon from the other radio and responding with a coded message requesting a connection. BR 103 or ER 111 initiating the connection is referred to as Initiating station (IS). A BR 103 or ER 111 that responds to a connection request is referred to as a Responding Station (RS). The term station is used to indicate either an IS or RS.

During the probing process, the IS and RS exchange information on very narrow frequency band(s), typically any value or range of values between about 5 Hz and 500 Hz. Typically, narrow frequency bands in the available shared spectrum that are free are used for the configuration process also. The frequency band(s) used in the configuration process are referred to as configuration process frequency vector. During the configuration process, the frequency band(s) that are available to be used for the data exchange in the bearer process and that have no primary users or secondary users currently existing are identified. From the available frequency bands, the BR103 chooses the optimum band. The optimum band may be chosen by reviewing the historic data to be assigned for use. This information on the chosen open and optimum spectral band(s) is exchanged with the ER(s) 111. The frequency band(s) used for the bearer process are referred to as a bearer process frequency vector. The term frequency vector refers to a list of frequency band(s) to be used and can optionally include other information such as an assigned priority of the various frequencies to be used within the frequency bands, network topology, encryption methodology, and the like. The bearer process frequency vector is used for establishing data communication between the BR 103 and the ER (s)111.

During or after a successful communication, a station may retry the last successful frequency vector(s). A station not successful in reconnecting or having trouble during an ongoing communication can follow the hierarchy of the methods in the reverse order to ensure a successful connection.

Probing Process

FIGS. 3-6 show an exemplary flow chart of the probing process. During the probing process, the two stations identify each other and as an output generate and exchange the configuration process frequency vector that is used by the configuration process. If the two stations are not successful during the process, the probing process is rescheduled and terminated. It will be appreciated that the order of the steps in the probing process may differ from that shown in the figures and described below.

The probing process may begin by building the probing process frequency vector. The probing process frequency vector can be built based on historical records, Fast Scan or by scanning all frequencies (Brute Force).

To build the probing process frequency vector using historical records a process is performed that may begin by checking if the use of historical database is enabled. The historical database has records of recent contact, heuristics and local propagation forecasts etc. If the use of historical database is enabled, the station builds the probing process frequency vector based on its database/records. If the historical database is not enabled the station will build the Probing process frequency vector using Fast Scan (block S302).

If the historical database is enabled, then the next step is to check if there was recent contact (block S303). In this step, the station consults its records to check for a previous successful communication. If there was recent contact in the station's records, it will insert the frequency into the probing process frequency vector. Otherwise, the process continues by checking if heuristics are available.

If there was a successful recent contact, the station inserts the frequencies used from the previous successful contact into the probing process frequency vector (block S304).

The probing process continues by performing a heuristics process (block S307). In this step, the station consults its historical records to check if heuristics are available. Based on previous contacts, the station can estimate the frequencies for the probing process frequency vector. If heuristics are available, the expected frequencies are inserted into the probing process frequency vector (block S308).

Otherwise, the process continues with a local propagation forecast step (block S312). In this step, the station will consult its historical records to check if records of local propagation have been calculated. The station can calculate the frequencies to be used for the Probing process frequency vector. If the calculated frequencies are available, the calculated frequencies are inserted into the Probing process frequency vector. Fast scan is done by selecting a frequency range and then each frequency in the frequency range is capture and analyzed. The frequencies that match the energy are marked and are updated into probing process frequency vector.

The process continues with a beacon scan (block S313). The steps involved in fast scan may include:
  check to see if fast scan is enabled;
  if fast scan is not available, then the next step is beacon scan;
  otherwise, the next step is to capture the frequency sample (block S306);
  capture the frequency sample (block S309);
  analyze the current frequency sample to see if the frequency sample matches the energy; if the sample matches the energy, the frequency is updated into the probing process frequency vector; otherwise the next frequency in the range is selected (block S310);
  update the current frequency sample that matches the energy (block S311);
  check to see if the end of the frequency range; if it is the next step is beacon scan, otherwise go to next sample (block S314);

increment the frequency to select the next sample (block S315)

It will be appreciated that the steps described above may vary from that shown and described. For example, the process may include fewer or additional steps and the order of some of the steps may vary.

Figure 4:
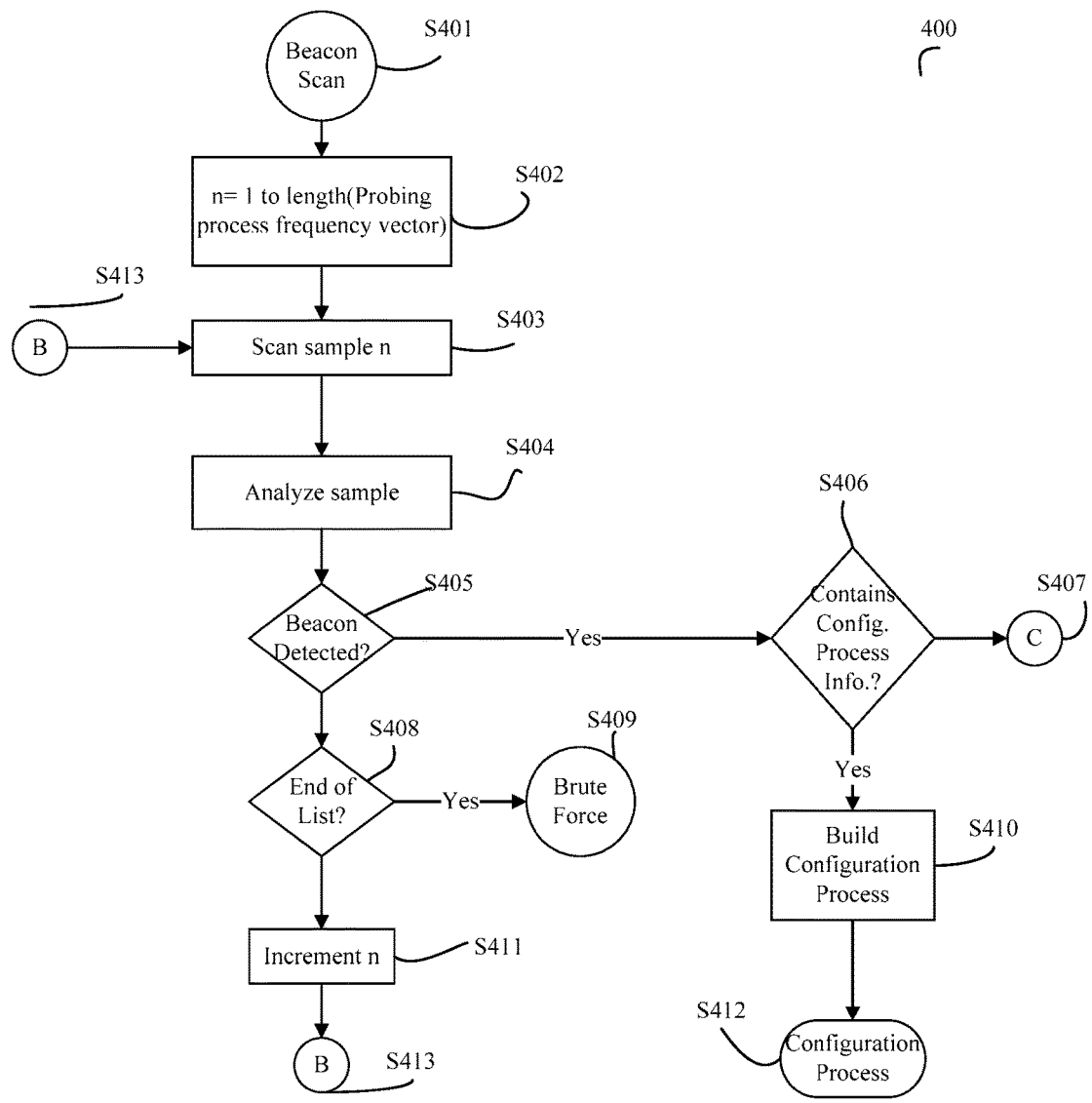

Once the building of the probing process frequency vector is complete, the next step is the beacon scan. An exemplary beacon scan process is shown in FIG. 4. During the beacon scan, each frequency in the probing process frequency vector is sampled and analyzed for the presence of a beacon. If a beacon is detected, it is verified to see if there is relevant configuration process information. The configuration process information is used to build the configuration process frequency vector and the configuration process starts and the Probing process is terminated. If valid configuration information is not there, a request for the configuration is sent out. If beacon is not detected and the end of the frequency range is not reached, the process continues to scan all frequencies. In one embodiment, the beacon scan includes:

- step through all the frequencies in the Probing process frequency vector (block S402);
- scan current sample (block S403);
- analyze current sample (block S404);
- analyze the current sample to detect the presence of a beacon (block S405);
- if a beacon is detected, the process continues by analyzing the current frequency sample to see if contains the configuration information (block S406);
- if the relevant configuration information is present, then the configuration process frequency vector is built (block S410);
- the probing process can terminate and the configuration process can begin (block S412);
- if the relevant configuration information is not present, then configuration information is requested (block S410);
- if the beacon is not detected, the process continues by checking to see if the end of frequency list is reached (block S408);
- if the end of frequency is not reached, the next frequency in the probing process frequency vector is selected and the process repeats (block S411);
- if the end of frequency is reached, then the next step is the brute force process (block S409).

It will be appreciated that the steps described above may vary from that shown and described. For example, the process may include fewer or additional steps and the order of some of the steps may vary.

Figure 5:
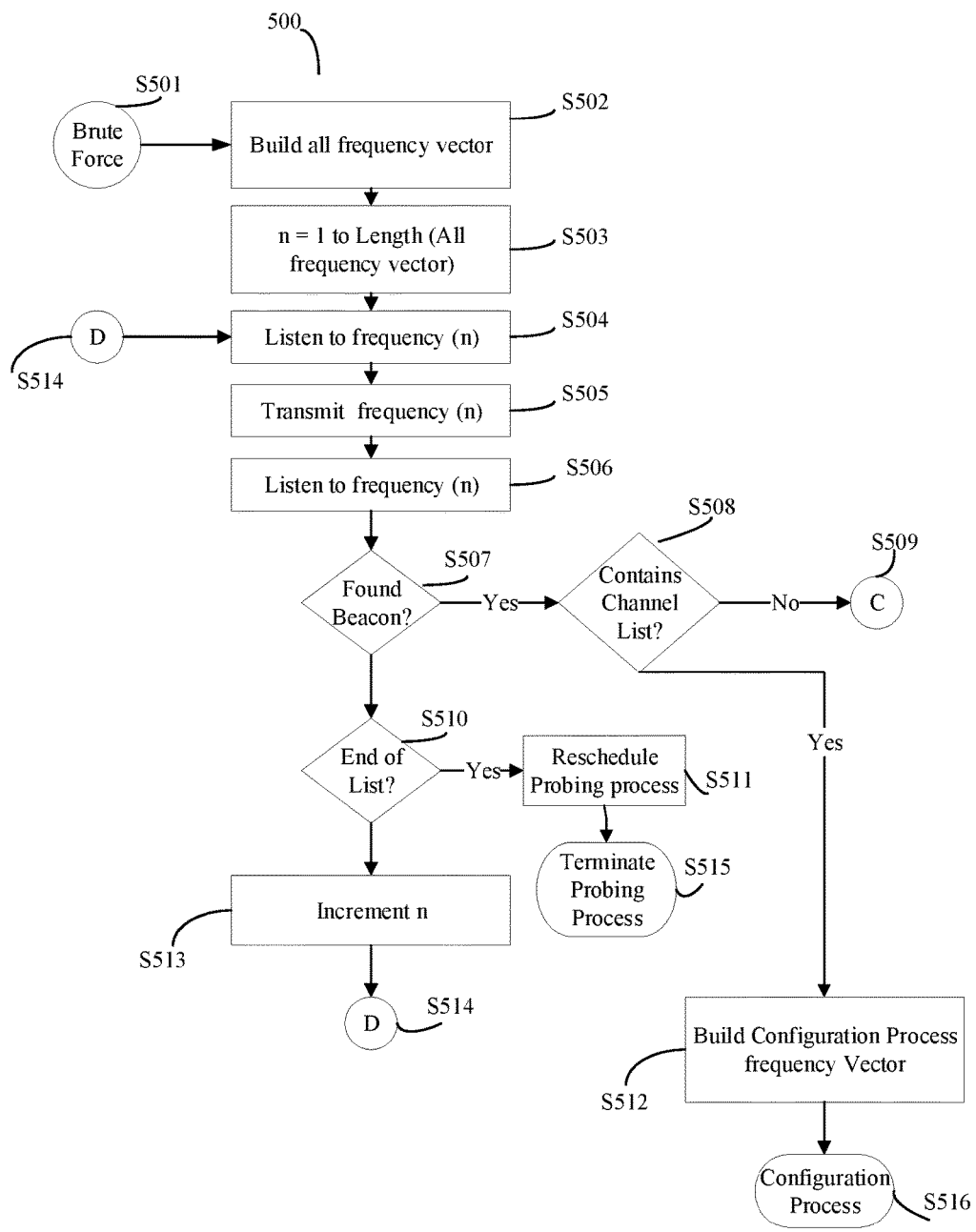
Figure 6:
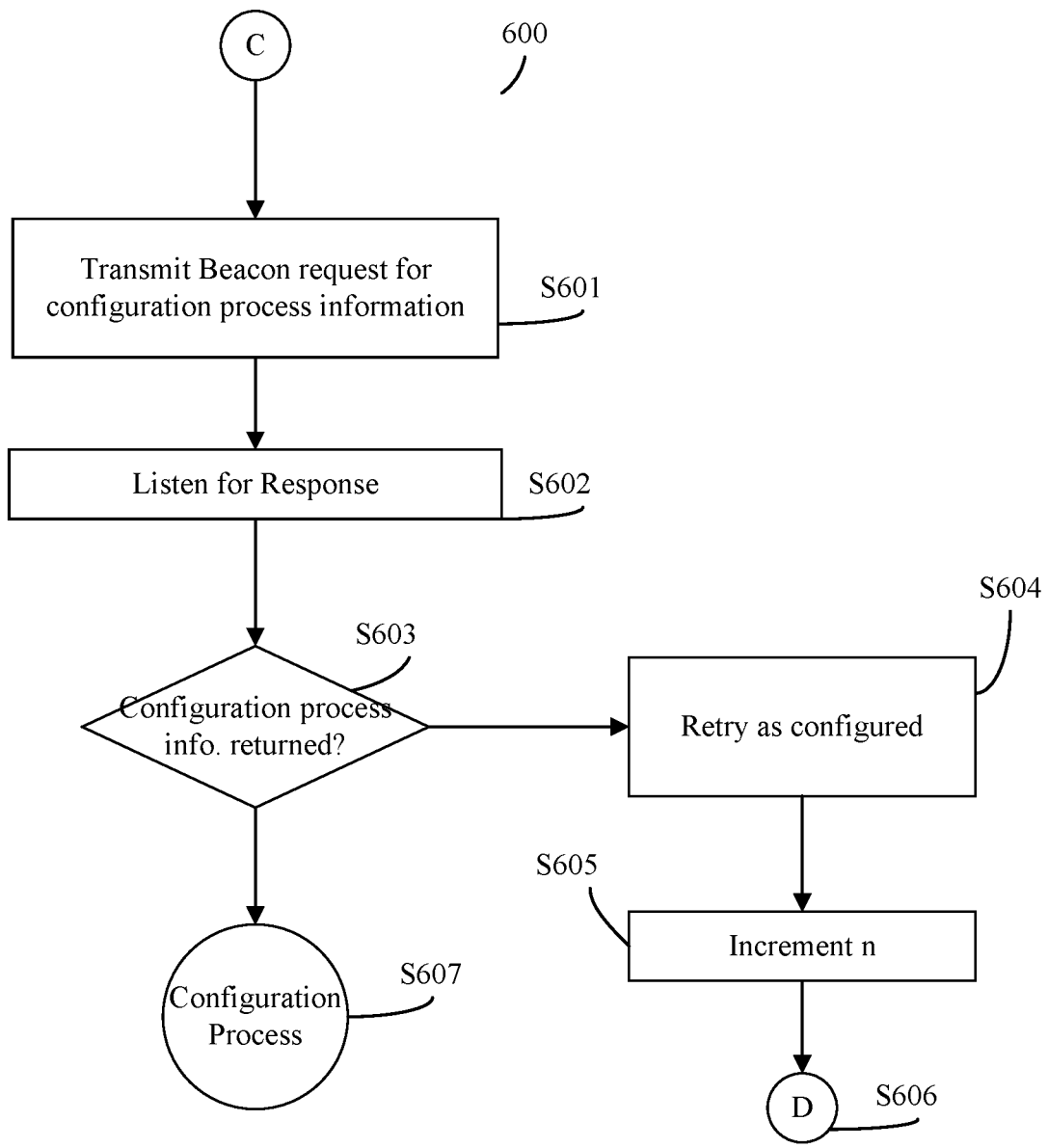

An exemplary process for scanning all frequencies is shown in FIG. 5. The scanning all frequencies process may include the following steps:

- create a list of all frequencies (block S502);
- step through all the frequencies in the list (block S503);
- listen to the current frequency step (block S504);
- optionally transmit current frequency step (block S505);
- listen to the current frequency step (block S506);
- analyze the current frequency step to detect the presence of a beacon (block S507);
- if a beacon is detected, then the current frequency sample is analyzed to see if it contains the configuration information (block S508);
- if the relevant configuration information is present, then the configuration process frequency vector is built (block S512)
- the probing process can terminate and the configuration process can begin (block S516)
- if the relevant configuration information is not present, then the process continues to the process shown in FIG. 6 (block S509);
- if the beacon is not detected, the process continues by checking if the end of frequency list has been reached (block S510);
- if the end of frequency list is not reached, the next frequency in the frequency range is selected and the process repeats as set forth above (block S513)
- if the end of frequency list is reached, the probing process is rescheduled (block S511);
- after rescheduling the probing process, the current probing process is terminated (block S515).

It will be appreciated that the steps described above may vary from that shown and described. For example, the process may include fewer or additional steps and the order of some of the steps may vary.

The probing process may continue by requesting configuration information if a beacon is detected and does not contain valid configuration process information. This process is shown in FIG. 6 and may include the following steps:

- transmitting a beacon requesting configuration process (block S601);
- listening to the response (block S602);
- analyzing the response for configuration process information (block S603);
- if a valid configuration process information is found, then the probing process is terminated and the configuration process is started (block S607);
- if a valid configuration process is not detected, the station retries the request (block S604);
- the next frequency in the list is selected (block S605).

It will be appreciated that the steps described above may vary from that shown and described. For example, the process may include fewer or additional steps and the order of some of the steps may vary.

Configuration Process

Figure 7A:
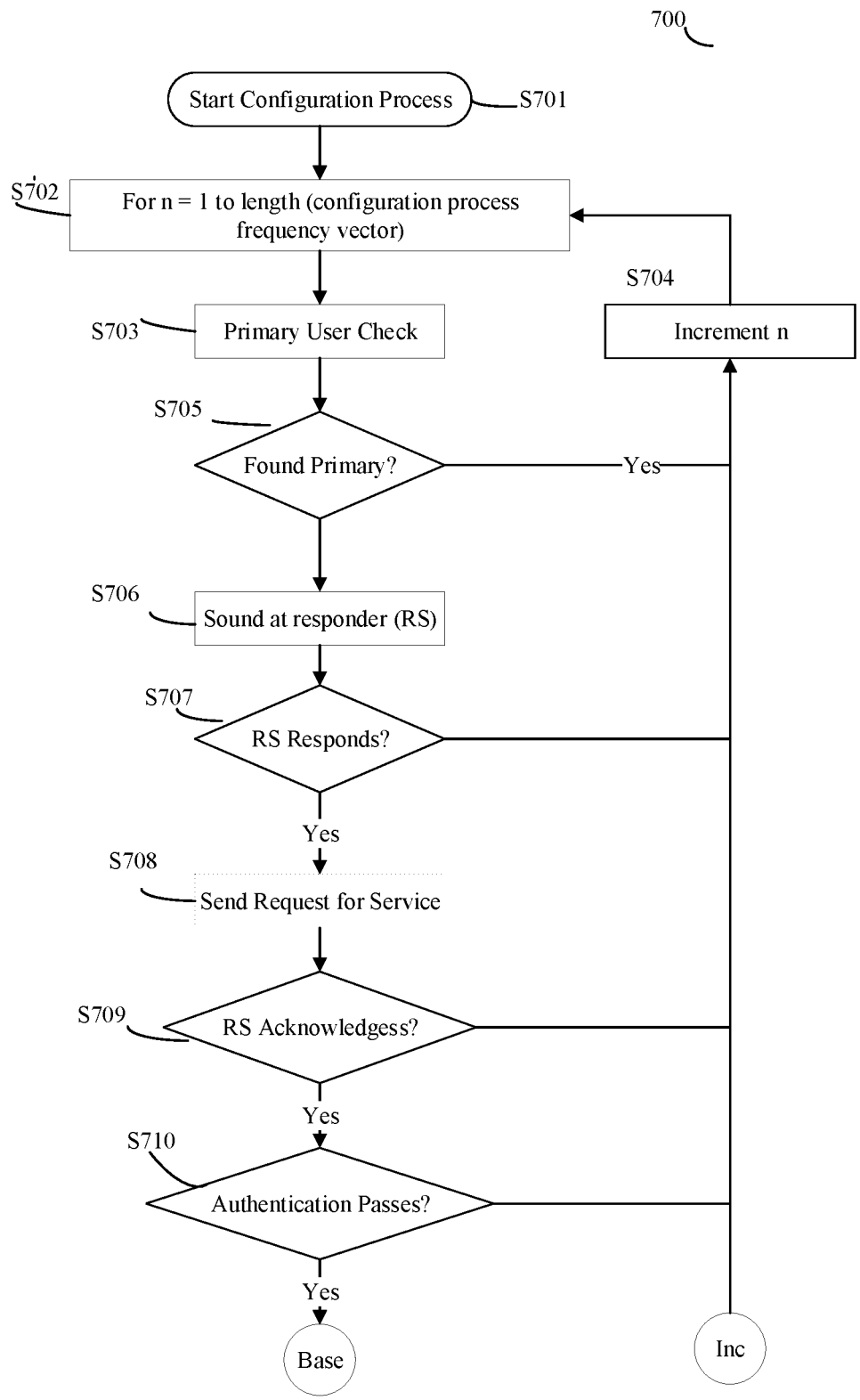
FIGS. 7A and 7B are a continuous exemplary flow chart and show a method for devices to perform a configuration of the communication channel for data exchange in accordance with embodiment of the invention.
Figure 7B:
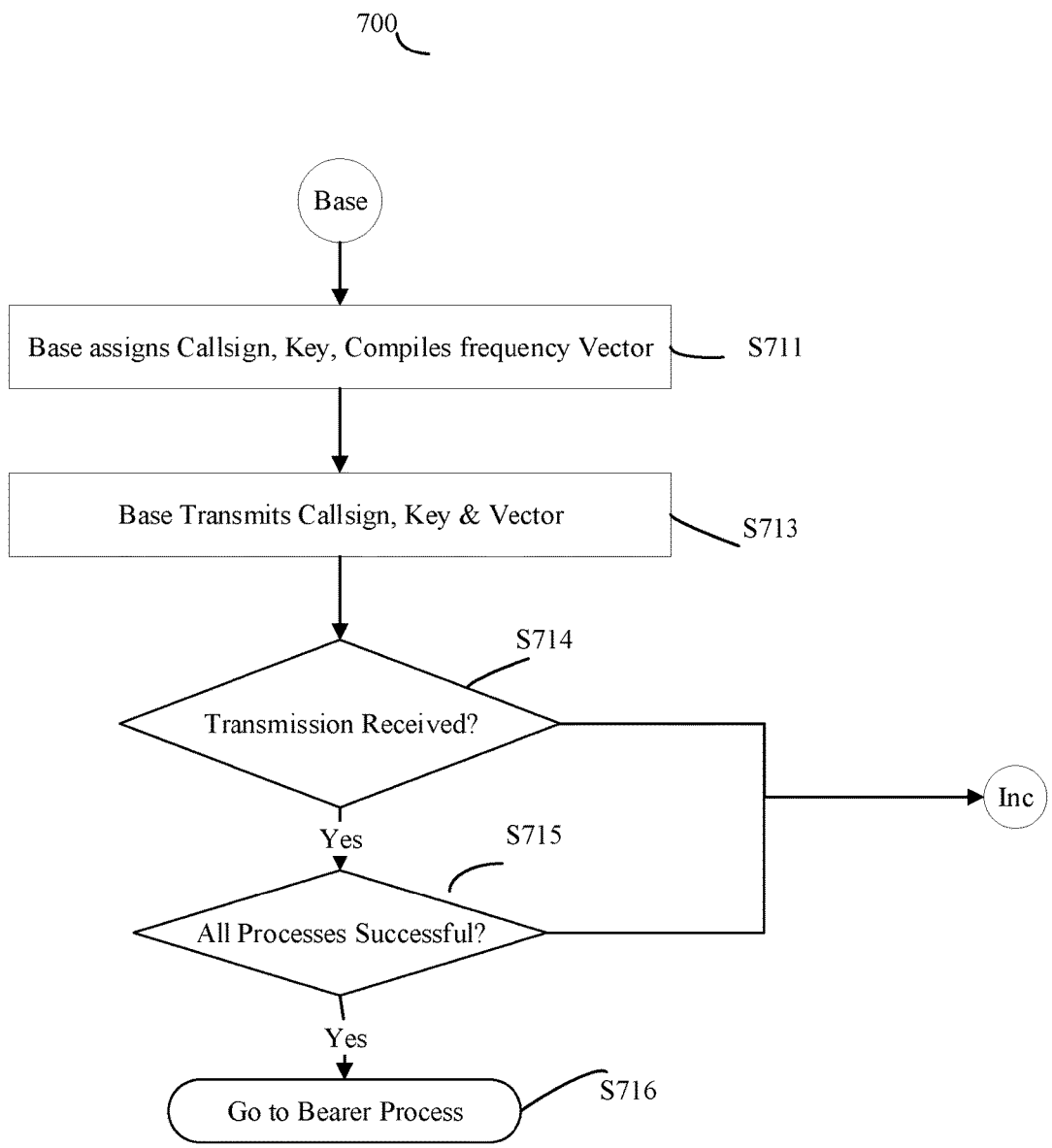

The configuration process is used by two stations to configure the link between them and identify and schedule the bearer process frequency vector for information transfer. An example of this process is shown in FIGS. 7A and 7B. The initiating station has either received a vector of configuration process frequency vector from the probing process or has an older vector from a previous exchange. Typically, the initiating station is a ER 111 but this is not a requirement.

Encryption (and other transfer parameters) is negotiated and arranged during the configuration process. Part of the configuration process will be the selection of whether encryption will be used and which encryption method is used. This information is provided as an output of this process and passed to the bearer process.

Embodiments of the invention can specifically handle any network topology. The configuration process can specifically sync the capabilities of the two ends and select and enable a specific network topology that may be required.

During the configuration process, the system evaluates multiple routes between endpoints. These routes may be different frequencies, different antennas, indirect hops through reachable endpoints and like. These routes are included in the bearer process frequency vector passed to the bearer process.

As a part of the configuration process, the BR 103 assigns callsign and key information. Callsign is a short address assigned by the BR, and is unique within the radio stations within a BR 103 and used for radio communication. Key is a short identifier assigned by the BR 103. It is unique within a BR 103. The address is typically encrypted. It is used to validate the identity of a calling station.

The result of the configuration process is a list of the frequencies, transfer parameters like encryption, best network topology and best route to be used by the bearer process to effect the information exchange. Exemplary steps for the configuration process include:

- loop through the all the frequencies in the configuration process frequency vector (block S702);
- check for existence of a primary user on the frequency (block S703);
- if a primary is found in S703, the next channel is selected (block S704);
- if no primary user is found, then the IS sounds at the RS (block S706);
- the IS waits for the RS to respond, and if the RS does not respond, the next channel in the list is selected (block S707);
- if the RS responds successfully, then the IS sends a request for service (block S708);
- the IS waits for an acknowledgement from the RS; if the RS acknowledgement is not received, the next frequency in the list is selected;
- if the RS acknowledges successfully, the IS checks if the authentication passes (block S710); if authentication fails, the next channel in the list is selected
- if authentication passes, the BR 103 assigns callsign, key, and table/list of propagation parameters, encryption (and other transfer parameters) is negotiated and arranged, and compiles the bearer process frequency vector (block S711);
- the BR 103 transmits the callsign, key and bearer process frequency vector (block S713);
- the successful reception of the transmission is checked; if the transmission was not successful, the next channel in the frequency list is selected (block S714);
- if the transmission of the frequency vector transmission was successful, the IS checks to see if all the processes were successful; if there are any failures, the next channel in the frequency list is selected (block S715);
- if all the processes were successful, the configuration process can terminate and the bearer process can start (block S716).

It will be appreciated that the steps described above may vary from that shown and described. For example, the process may include fewer or additional steps and the order of some of the steps may vary.

Upon successful completion of the configuration process, the process logs the data (records of the frequencies, time, Signal to Noise Ratio etc.). If the process fails, the failure data is logged. If the configuration process can be restarted, the configuration process is restarted. If the configuration process cannot be restarted, the configuration process is terminated and the probing process is started.

Configuration Reconnect

The ER 111 or BR 103 can reconnect within a recently recent time period (without any radical changes to the frequency on record). The reconnect process begins by the IS pinging the RS. The IS may send an authentication request. If the RS responds and the authentication request passes successfully, the IS may either request to use the last vector or assign a new vector and the process can continue to the bearer process. If the reconnect process fails, the process starts over at probing process.

Bearer Process

Figure 8:
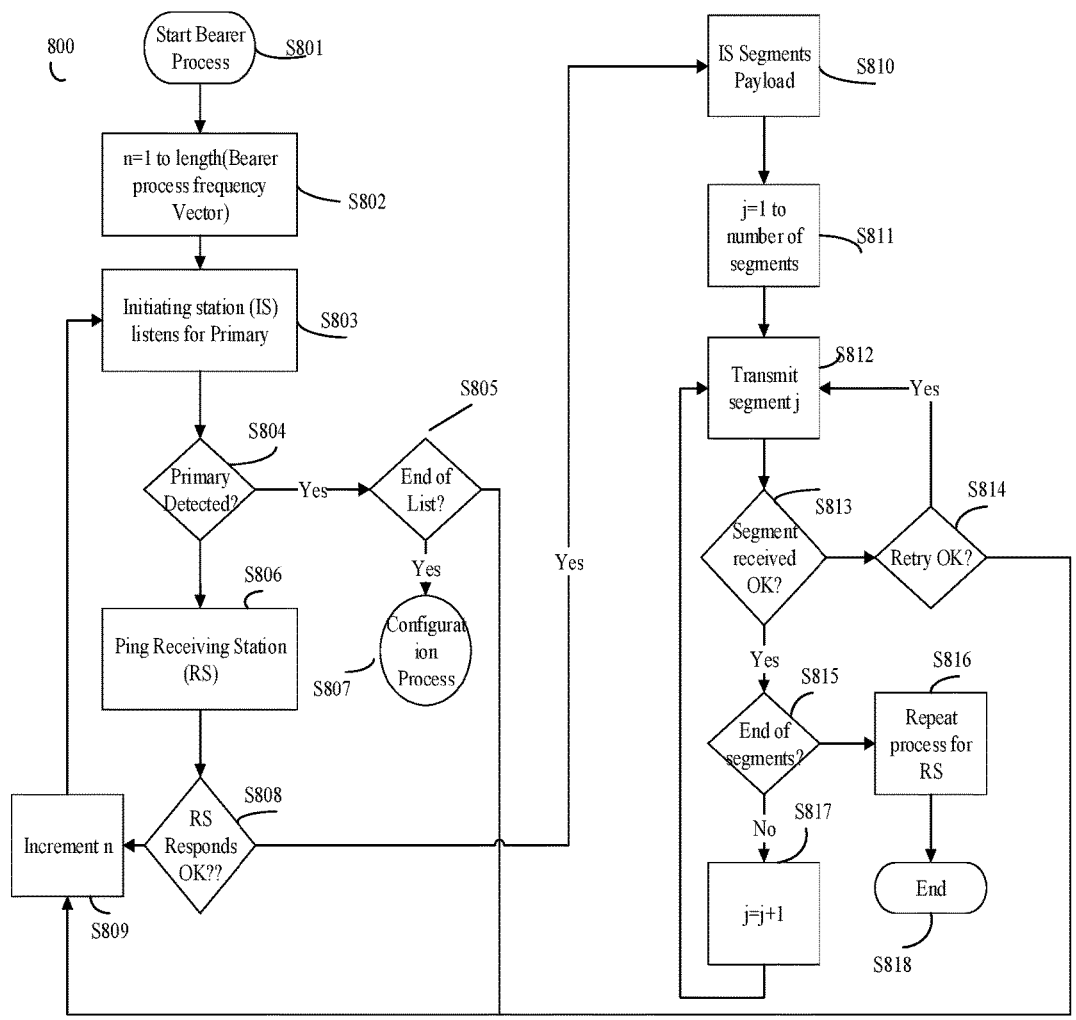
FIG. 8 shows a method for devices to perform data transfers in accordance with an embodiment of the invention.

The bearer process is the process where the BR 103 and the ER 111 exchange data or information. The bearer process receives a bearer process frequency vector from the configuration process which includes a list of frequencies that can be used for the information exchange and also includes other transfer parameters, such as encryption, etc. Upon successful completion of the bearer process, the various transfer parameters are logged and the process is terminated. If the bearer process fails, the process is terminated and the configuration process is started. An exemplary implementation of the bearer process is shown in FIG. 8. The bearer process loops through the bearer process frequency vector. It first checks for the presence a primary user in the current frequency step, if a primary user is detected, it goes to the next frequency or configuration process (if there are no more frequencies). If a primary user is not detected, then the IS pings the RS and waits for an "OK" response. If an "OK" response is not received, the next frequency is selected. If an "OK" response is received, the IS segments the message in appropriate chunks. Each segment is transmitted and successful reception of the segment is verified. If the reception of a segment fails, the transmission of the segment is retried. If the retry fails, the next frequency in the list is selected. Once all the segments of the message have been transmitted by the IS, the process is repeated by the RS to transmit the message. Upon successful transmission, the bearer process is terminated. Key transfer statistics may be recorded and used for assessment. The bearer process may include the following steps:

- loop through all the frequencies in the bearer process frequency vector (block S802);
- IS listens for a primary user (block S803);
- detect the presence of a primary user (block S804);
- check if the IS has looped through all the frequencies (block S805);
- if the IS has looped through all frequencies, terminate the bearer process and go back to the configuration process (block S807);
- if there are more frequencies in the list, select the next frequency (block S809);
- if no primary user is detected (block S805), the IS pings the receiving station with an appropriate message (block S806);
- the IS waits for the RS to respond and check if the response is OK (block S808);
- if the response is not OK (block S808), the next frequency in the list is selected;
- if the response is OK (block S808), the IS segments the message into appropriate sized chunks (block S810);
- the IS loops through each of the segments (block S811);
- the IS transmits the current segment (block S812);
- IS verifies to see if the current segment was received correctly (block S813);
- if the current segment was not received correctly (block S813), the transmission of the segment is retried and the status of the retry is checked; if the retry was successful, the next segment is transmitted, otherwise, the next frequency in the list is selected (block S814);
- the IS checks to see if all segments have been transmitted successfully; if there are more segments the next segment is selected to be transmitted (block S817)
- if all segments have been successfully transmitted by the IS, the process is repeated for the RS to transmit (block S816).

Upon successful completion of transmission by the RS, the process is terminated.

BER (Bit Error Rate), SNR (Signal Noise Ratio), retries and other key parameters are tabulated on an ongoing basis. Assessment of key parameters occurs after every transaction or after certain period of time. Assessment is done to ensure the key parameters are within a specified limit. If the key parameters are not within the specified limit, the link parameters may be adjusted (typically by BR).

Although a number of possible implementations have been described, these are presented merely for the sake of explanation and teaching, and are not limiting. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method comprising:
    performing a routine by a base station radio to find a remote end radio;
    identifying the remote end radio;
    transmitting a beacon from the base station radio to the remote end radio over a configuration band frequency vector wireless communication link;
    receiving a response from the remote end radio over the configuration band frequency vector wireless communication link, the response being a request for connection from the remote end radio;
    configuring the connection between the base station and the remote end radio, wherein configuring the connection comprises identifying a bearer process frequency vector wireless communication link; and
    exchanging information between the base station and the remote end radio over the bearer process frequency vector wireless communication link.

2. The method of claim 1, further comprising uniquely identifying the remote end radio.

3. The method of claim 2, wherein uniquely identifying the remote end radio comprises a probing process and beacon protocol.

4. The method of claim 3, wherein the probing process and beacon protocol comprises creating a list of frequencies to transmit and/or scan.

5. The method of claim 4, further comprising creating the list, wherein the list is created by scanning a particular band of energy and marking the frequencies using the historical records/databases, heuristics and the calculated local propagation window or a list of all frequencies.

6. The method of claim 1, further comprising detecting spectrum characteristics.

7. The method of claim 1, further comprising detecting unused frequency bands available for secondary use.

8. The method of claim 7, wherein unused frequency bands are detected and characterized based on temporal characteristics.

9. The method of claim 1, further comprising creating a list of optimum frequency bands for information exchange based on the spectrum characteristics and unused frequency bands.

10. The method of claim 1, further comprising automatically detecting the presence of a primary user and automatically moving to a different frequency band.

11. The method of claim 1, further comprising exchanging a list of optimum frequency bands with adjacent remote end radios and/or base stations.

12. The method of claim 1, further comprising monitoring and configuring the link between the base station radio and the remote end radio during the data exchange.

13. The method of claim 1, further comprising automatically adjusting the bearer process frequency vector used for data transfer based on assessment of key parameters.

14. The method of claim 1, wherein data transfer is initiated by the base station radio or the remote end radio.

15. The method of claim 1, wherein the data exchange is protocol agnostic.

16. The method of claim 1, wherein security/encryption between the base station radio and the remote end radio is negotiated.

17. The method of claim 1, further comprising end-to-end encrypting during the data exchange.

18. The method of claim 1, wherein the wireless communication link is in a network comprising at least one of star network, mesh network or hybrid network topology.

19. The method of claim 1, further comprising dynamically selecting a best route for data exchange.

20. The method of claim 19, further comprising evaluating multiple routes between the base station radio and the remote end radio.

21. The method of claim 20, wherein the multiple routes comprise at least one of different frequencies, involve different antennas, involve indirect hops through reachable remote end radios.

22. A system comprising:
a base station radio;
a plurality of remote end radios, each of the plurality of end radios coupled to at least one data collection device,
wherein the base station radio is configured to:
find a remote end radio from the plurality of remote end radios;
identify the remote end radio;
transmit a beacon from the base station radio to the remote end radio over a configuration band frequency vector wireless communication link;
receive a response from the remote end radio over the configuration band frequency vector wireless communication link, the response being a request for connection from the remote end radio;
configure the connection between the base station and the remote end radio, wherein configuring the connection comprises identifying a bearer process frequency vector wireless communication link; and
exchange information between the base station and the remote end radio over the bearer process frequency vector wireless communication link.

23. The system of claim 22, wherein the base station radio is further configured to uniquely identify the remote end radio.

24. The system of claim 23, wherein uniquely identifying the remote end radio comprises a probing process and beacon protocol.

25. The system of claim 24, wherein the probing process and beacon protocol comprises creating a list of frequencies to transmit and/or scan.

26. The system of claim 25, wherein the base station radio is further configured to create the list, wherein the list is created by scanning a particular band of energy and marking the frequencies using the historical records/databases, heuristics and the calculated local propagation window or a list of all frequencies.

27. The system of claim 22, wherein the base station radio is further configured to detect spectrum characteristics.

28. The system of claim 22, wherein the base station radio is further configured to detect unused frequency bands available for secondary use.

29. The system of claim 28, wherein unused frequency bands are detected and characterized based on temporal characteristics.

30. The system of claim 22, wherein the base station radio is further configured to create a list of optimum frequency bands for information exchange based on the spectrum characteristics and unused frequency bands.

31. The system of claim 22, wherein the base station radio is further configured to automatically detect the presence of a primary user and automatically moving to a different frequency band.

32. The system of claim 22, wherein the base station radio is further configured to exchange a list of optimum frequency bands with adjacent remote end radios and/or base stations.

33. The system of claim 22, wherein the base station radio is further configured to monitor and configure the link between the base station radio and the remote end radio during the data exchange.

34. The system of claim 22, wherein the base station radio is further configured to automatically adjust the bearer process frequency vector used for data transfer based on assessment of key parameters.

35. The system of claim 22, wherein data transfer is initiated by the base station radio or the remote end radio.

36. The system of claim 22, wherein the data exchange is protocol agnostic.

37. The system of claim 22, wherein security/encryption between the base station radio and the remote end radio is negotiated.

38. The system of claim 22, wherein the base station is further configured to end-to-end encrypt during the data exchange.

39. The system of claim 22, wherein the wireless communication link is in a network comprising at least one of star network, mesh network or hybrid network topology.

40. The system of claim 22, wherein the base station is further configured to dynamically select a best route for data exchange.

41. The system of claim 40, wherein the base station is further configured to evaluate multiple routes between the base station radio and the remote end radio.

42. The system of claim 41, wherein the multiple routes comprise at least one of different frequencies, involve different antennas, involve indirect hops through reachable remote end radios.

* * * * *